April 9, 1946.   L. ROBBINS   2,398,251
DRILLING MACHINE
Filed Oct. 12, 1942   5 Sheets-Sheet 5
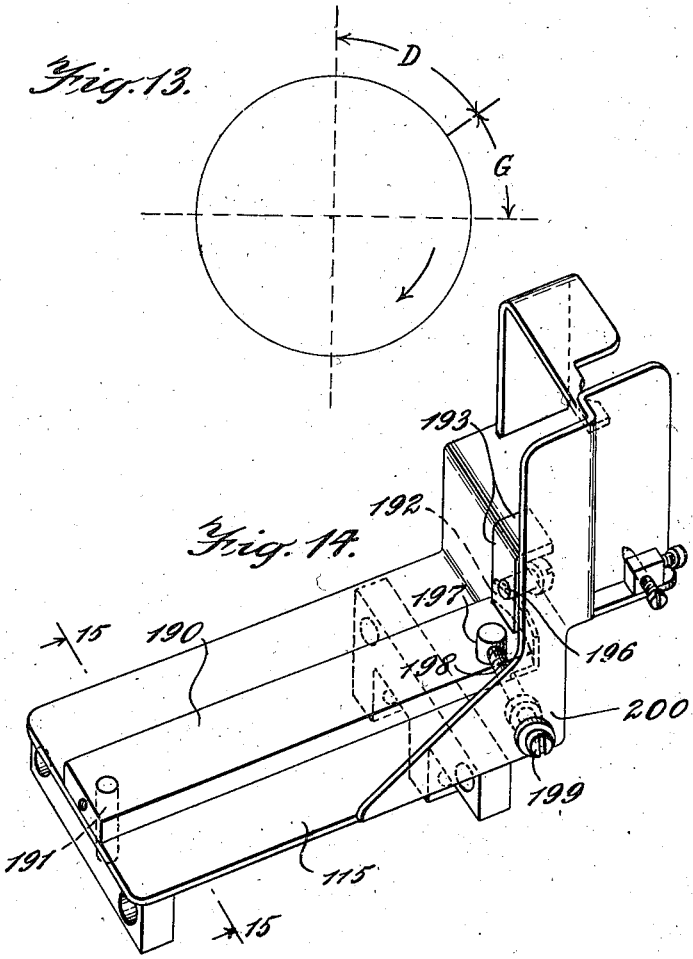
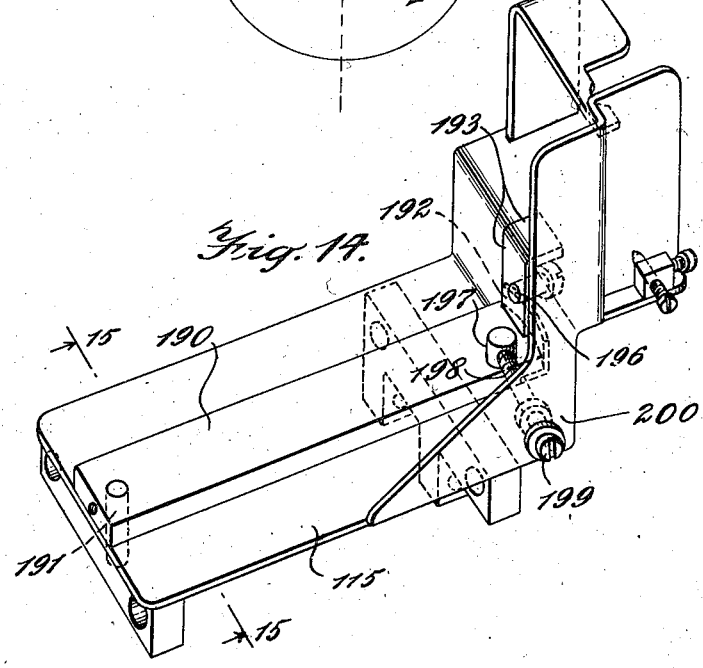
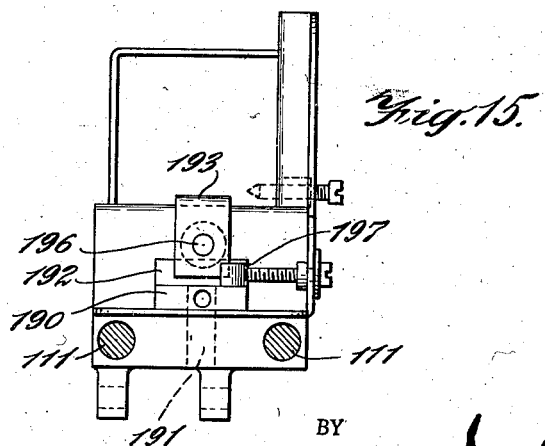
INVENTOR.
Leo Robbins
BY
ATTORNEYS.

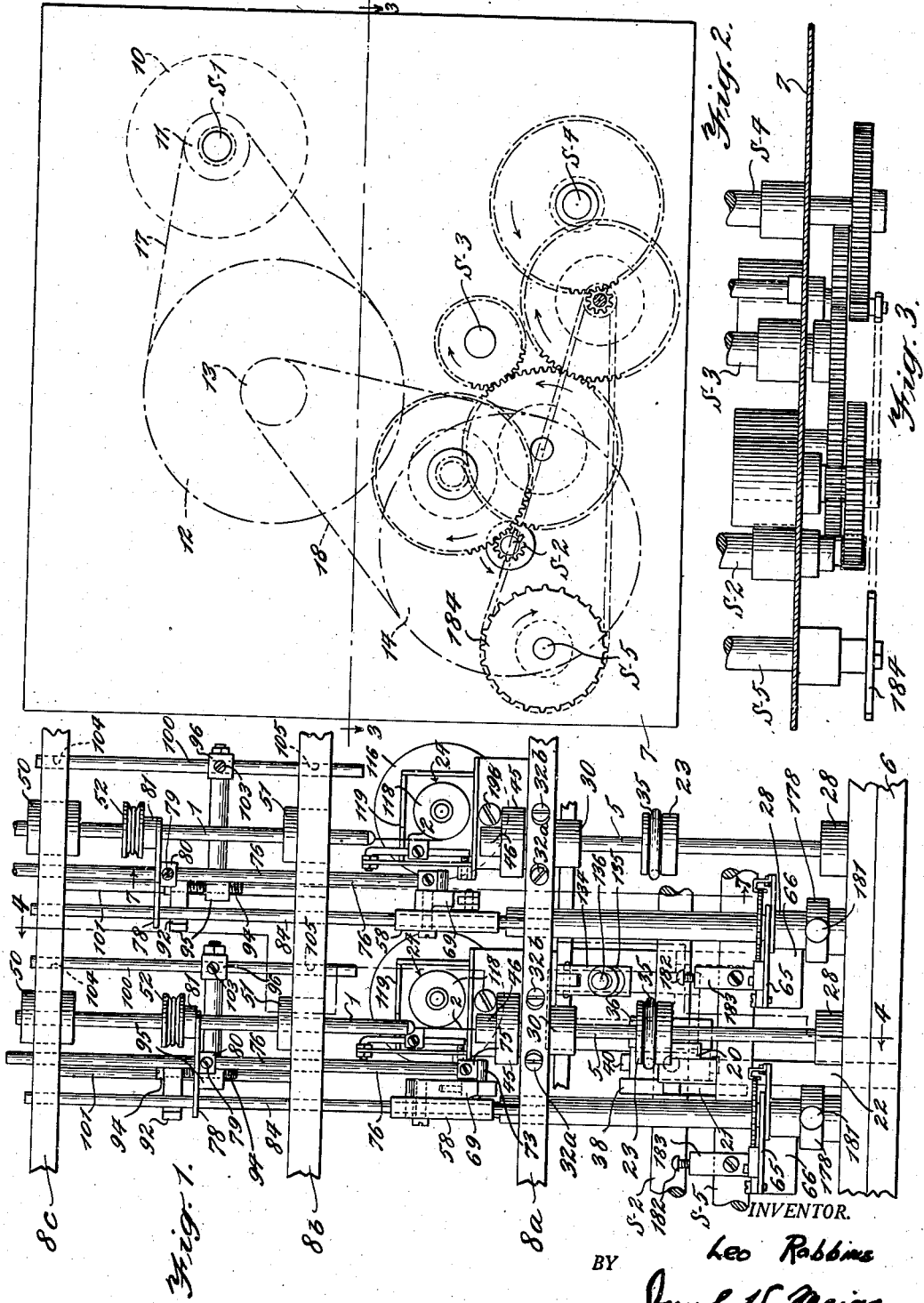

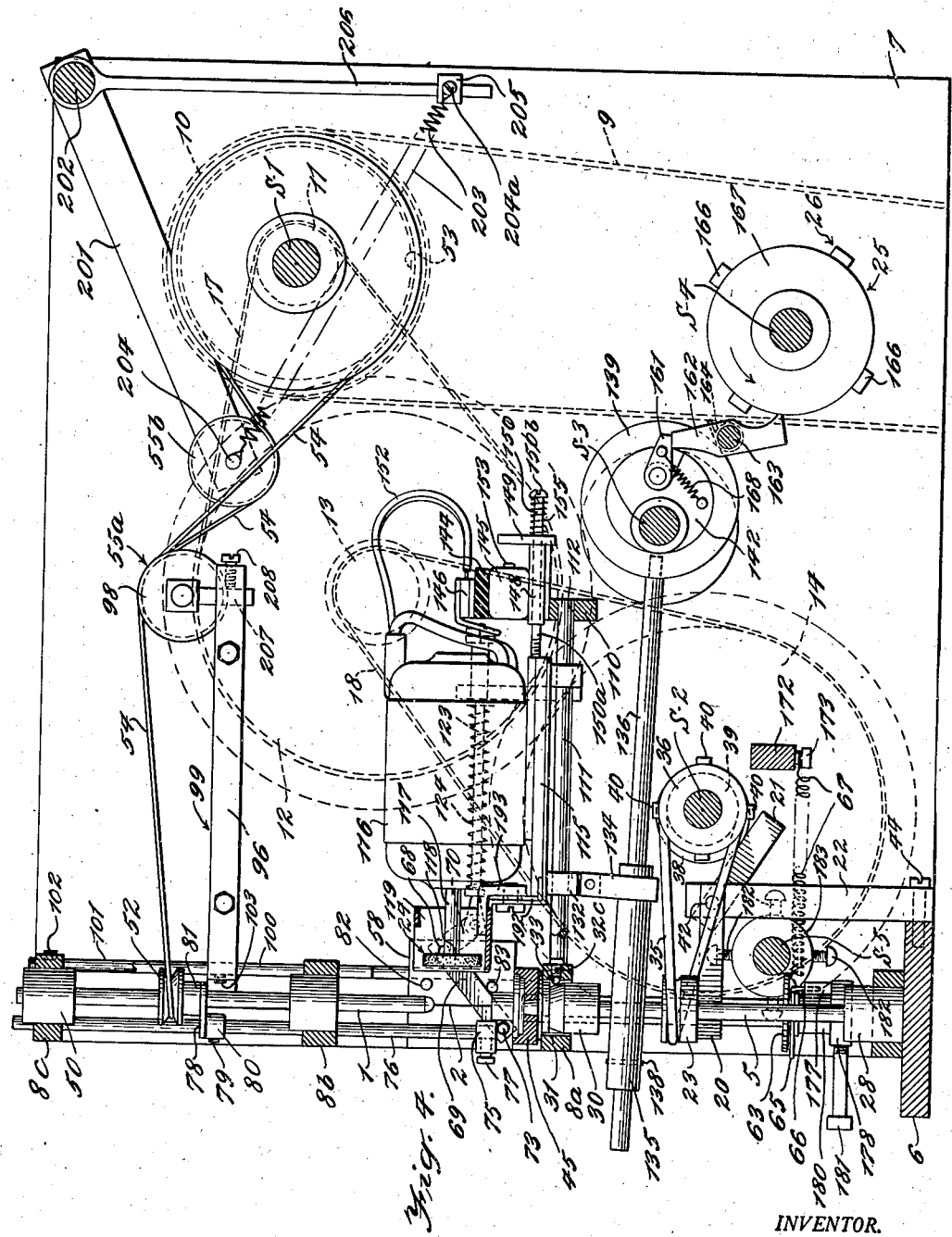

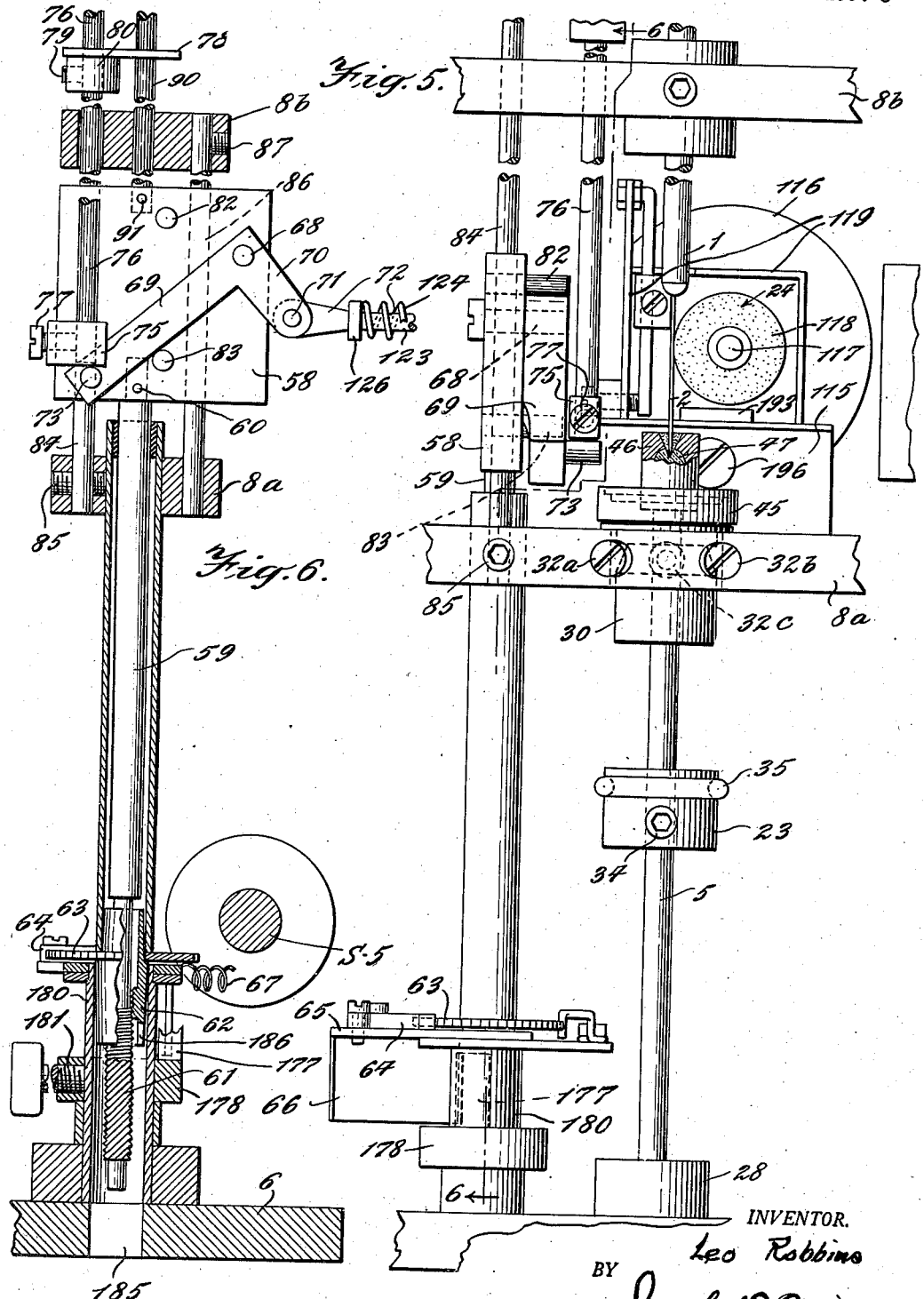

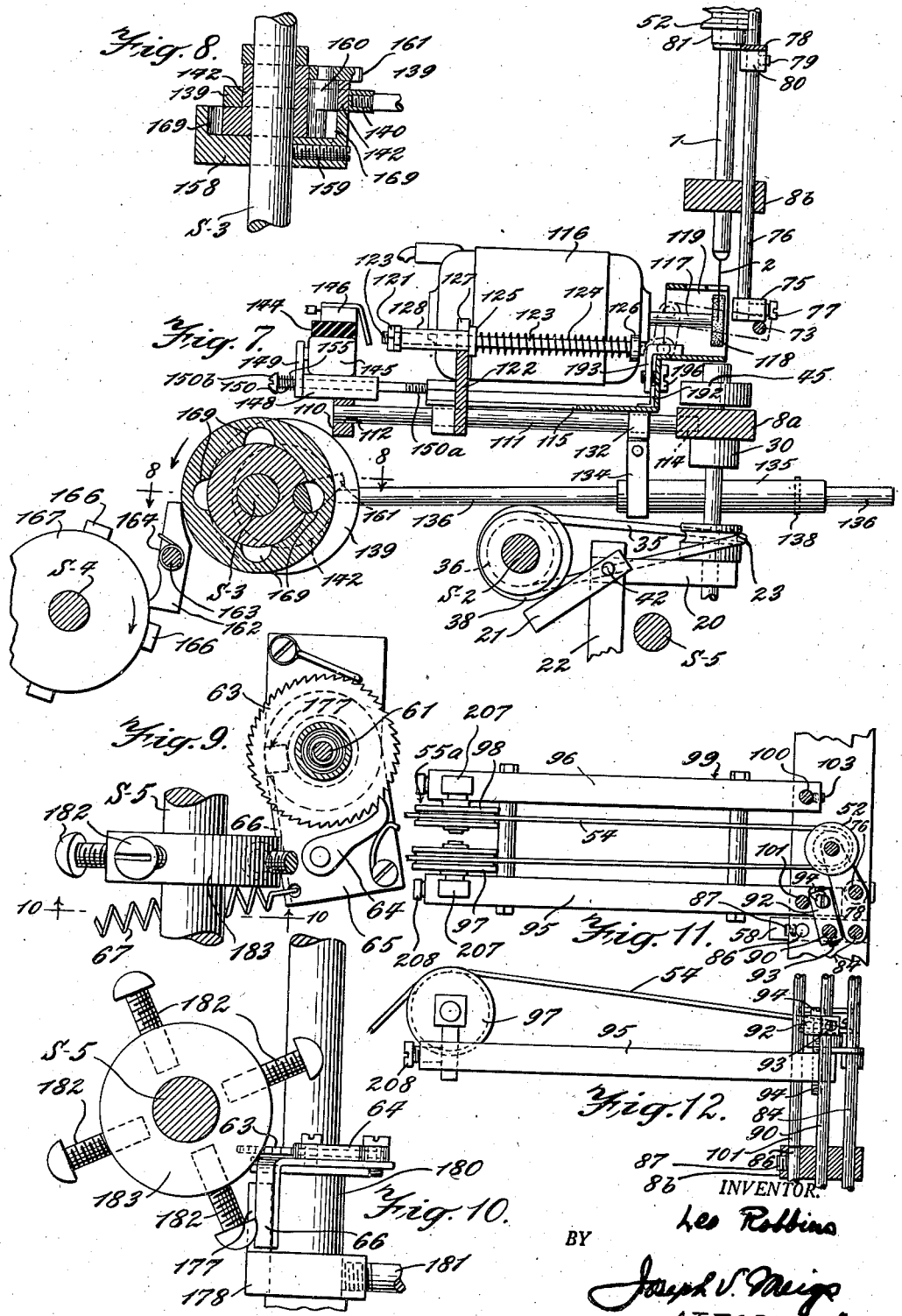

Patented Apr. 9, 1946

2,398,251

UNITED STATES PATENT OFFICE 2,398,251

DRILLING MACHINE

Leo Robbins, New York, N. Y., assignor, by mesne assignments, to Reconstruction Finance Corporation, a corporation of the United States Application October 12, 1942, Serial No. 461,724

24 Claims. (Cl. 125—30)

This invention relates to the art of drilling, particularly the drilling of hard substances as, for example, diamonds. The invention also relates to the art of manufacturing wire-drawing dies.

One of the objects of the invention is to provide improved automatic mechanism for the drilling of diamonds used in wire-drawing dies.

A further object of the invention is to provide automatic means for creating in a diamond or other hard substances a generally conical depression of predetermined and controlled magnitude and contour in connection with the manufacture of a wire-drawing die.

A further object is to provide automatic mechanism for creating and maintaining a predetermined shape of the point of a drill during a drilling operation.

Further objects and advantages will hereinafter appear.

The principles of the invention will be defined in the claims. The following description and accompanying drawings are intended to illustrate and teach those principles which may be embodied in forms specifically different from those herein described and shown in the drawings.

In accordance with the invention there is provided mechanism comprising a drill spindle having a vertical axis carrying a drill at the lower end thereof and a work holder which also has a vertical longitudinal axis. Below and in spaced relation to the drill there is provided a work holder having a vertical longitudinal axis and is adapted to carry at the top thereof a work piece (for example, a diamond mounted in a die mounting). During the drilling operation the work piece is in drilling relation with the point of the drill. Means are provided to rotate the work holder and drill to effect abrasion of a predetermined point or area on the work piece by means of suitable abrasive compound which in the case of a diamond drilling may be diamond dust. At regular and predetermined intervals the point of the drill is subjected to a controlled grinding operation which maintains a predetermined shape of that point so that the depression in the work piece may be correspondingly controlled and maintained. To accomplish this purpose a movement is provided which separates the drill point and the work piece and positions the drill point at a predetermined point above and in spaced relation to the work piece and out of drilling relation to the work piece and in a position where the point of the drill may be subjected to a grinding operation.

Stated otherwise, the drilling operation is carried on for a predetermined interval while the point of the drill and the work piece are in drilling relation. Then the drilling operation is discontinued, the point of the drill separated from the work piece and placed in spaced relation thereto and out of drilling relation thereto; and a grinding operation is initiated and maintained for a predetermined period.

To accomplish the grinding operation, a grinding means, as for example a grinding wheel, is provided and mounted to rotate about an axis generally transverse to the axis of the drill and work piece. In the specific embodiment shown in the drawings, the axis of rotation of the grinding wheel is perpendicular to the axes of the drill and work piece. During the drilling operation the grinding wheel is positioned out of the vertical path of movement of the drill. To effect the grinding operation the grinding wheel is moved through a path transverse to the axes of the drill and work piece and is brought into engagement with the point of the drill. The relation of the axis of the drill to the circumference or periphery or flat side of the grinding wheel and the diameter of the latter may be controlled to control the shape of the point of the drill which is ground.

As previously mentioned, the grinding relation between the grinding wheel and drill is brought about by a translatory movement of the grinding wheel into engagement with the point of the drill. When the grinding wheel comes into contact with the point of the drill, translatory movement of the grinding wheel is preferably continued while maintaining rotation of the grinding wheel, and the grinding operation is continued during a predetermined interval. Thereafter the grinding wheel is moved back out of the vertical path of movement of the drill to the original normal position of the grinding wheel. The drill and work piece are then again brought into drilling relation and the drilling operation is resumed. In other words, a continuously repeated cycle of operations is provided comprising a drilling operation while the point of the drill and work piece are in drilling relation, followed by a grinding operation while the point of the drill and work piece are separated a distance sufficient to permit said grinding operation. Each of these operations is carried on for a predetermined interval.

In order to separate the drill and work piece so that the drill may be subjected to a grinding operation, the work piece may be held in a fixed vertical position and the drill raised to a predetermined point above and in spaced relation to the work piece, or the drill may be held in a fixed vertical position and the work piece may be lowered to a position below and in spaced relation to the point of the drill. The drill is continuously rotated both during the drilling and grinding operations. In the specific form shown in the drawings, the separation of work piece and drill is effected by raising the drill above the work piece and placing it in position where it is subjected to the grinding operation, after which the drill is lowered into grinding position, the grinding wheel, as explained, having been moved out of the vertical path of movement of the drill after the grinding operation is completed.

In addition to the movement of rotation of the drill and, if necessary, of the work piece, means are provided to effect a series of rapidly recurring separations of the drill and work piece so that during the drilling operation there is a combined movement of rotation and a translatory relative movement in a vertical path defined by the axis of the drill and the work piece. This relative vertical movement is an up and down movement, the amplitude of which may be very small. These up and down movements are of course entirely distinct from the above described separation of the work piece and drill to accomplish the grinding operation. These up and down movements need occur only during the drilling operation whereas the separation of the work piece and drill, as above mentioned, for the purpose of grinding the drill occurs only during the grinding operation. During the up and down movements incidental to the drilling operation, the point of the drill recedes slightly from the surface of the work piece with which it was in contact and is then brought back toward that surface. This up and down movement permits the abrasive compound to enter between the point of the drill and the surface of the work piece upon the up movement so that upon the down movement there will be sufficient abrasive compound between the drill and the surface of the work piece to accomplish the desired abrading action, since the cutting of the work piece is accomplished directly by the abrasive, the function of the drill being to carry and actuate the abrasive.

Means are also provided to control the degree of pressure exerted in a vertical direction at the point of contact between the drill and work piece. In one form of the invention, as specifically shown in the drawings, the drill spindle is suspended above the work piece. The weight of the spindle urges it downwardly into contact with the work piece and means are provided to controllably oppose or increase this downward urge so that the pressure of the drill on the work piece may be controlled, as will hereinafter be more fully explained.

As the grinding operation continues the length of the drill decreases due to grinding away thereof, and means are provided to compensate for this wear so that the drill will properly follow through the depression created in the work piece.

Means are also provided to properly align the vertical axes of the drill spindle and work holder to confine the vertical movement of the drill to a predetermined vertical path in relation to the work piece.

Reference will now be had to the drawings and the specific details thereof, in which:

Fig. 1 is a front elevation;

Fig. 2 is a diagrammatic elevational view showing the assembly of driving pulleys, gears and idlers;

Fig. 3 is a plan view taken on the line 3—3 of Fig. 2;

Fig. 4 is a section on the line 4—4 of Fig. 1;

Fig. 5 is an enlarged front elevational view of one of the units shown in Fig. 1;

Fig. 6 is a section on the line 6—6 of Fig. 5;

Fig. 7 is a section on the line 7—7 of Fig. 1;

Fig. 8 is a section on the line 8—8 of Fig. 7;

Fig. 9 is a detailed plan view of the mechanism shown at the bottom of Fig. 6;

Fig. 10 is a view on the line 10—10 of Fig. 9;

Fig. 11 is a plan view of the mechanism for driving the drill spindle; and

Fig. 12 is an elevational view of the apparatus shown in Fig. 11.

Fig. 13 is a diagrammatic view illustrating the time periods of the operations of drilling and grinding (abbreviated by the letters "D" and "G," respectively) in relation to the operation of the mechanism which controls these periods;

Fig. 14 is a perspective view of the motor carriage and mechanism for adjusting the angular position of the axis of the shaft carried by the motor on which shaft the grinding wheel is mounted, in relation to the vertical axis of the drill; and Fig. 15 is an end view on the line 15—15 of Fig. 14.

The drilling unit comprises the drill spindle 1, the drill 2 mounted therein and the work holder 5 and associated mechanism. As many of these units as desired may be employed, Fig. 5 showing one and Fig. 1 showing a group of two. For supporting the apparatus and various parts thereof, the support members include a bottom platform 6, end walls 7, one of which is shown in Fig. 3, and longitudinal support strips 8a, 8b and 8c extending between and secured to the end walls. Shafts for effecting the various movements extend transverse to the end walls and are journalled therein as shown in Fig. 3, the principal shafts being S—1, S—2, S—3, S—4 and S—5. Mounted on the shaft S—1 at the end wall opposite to that shown in Fig. 3, is a driving pulley 10 which is driven by a motor not shown. Shaft S—1 by means of intermediate pulleys 11, 12, 13 and 14 and belts 17 and 18 drives shaft S—2, the speed of the shaft S—2 being reduced to a predetermined amount in relation to the speed of shaft S—1 by means of the said intermediate pulleys. The pulleys 10, 11, 12, 13 and 14 are mounted in bearings supported by the end wall opposite to that shown in Fig. 3.

On the shaft S—2 there is mounted means, one for each unit, more fully hereinafter explained, for rotating the work holder 5 and imparting to it an up and down movement. For this purpose there is provided the lever comprising arms 20 and 21 pivoted on the vertical support 22 by means of pivot 42, said lever cooperating with pulley 23 secured to work holder 5. The vertical support 22 is secured to the base 6 by means of screw 44.

The shaft S—3 is provided with eccentric means, one for each unit, for effecting the translatory movement of the grinding wheel 24 into and out of engagement with the drill 2 at predetermined intervals synchronized with the separation of the drill from the work piece to permit that grinding operation. The specific details of this eccentric mechanism and the operation thereof will be explained later.

The shaft S—4 is provided with timing means, one for each unit, including the collar 25 and pins 26 for releasing operation of the eccentric mechanism on shaft S—3 at predetermined time intervals.

The work holder 5 is journalled in a bottom bearing 28 and a top bearing 30 and the latter is adjustably positioned in a cylindrical hole 31 within the supporting strip 8a by means of three adjusting screws 32a, 32b and 32c (see Figs. 4 and 5) each of which cooperates with a ball 33 bearing against the bearing 30, one of these screws 32c being shown in Fig. 4. The work holder 5 is driven by a pulley 23 secured thereto by screw 34, the driving being effected by belt 35 connected to a pulley 36 mounted on shaft S—2. On this shaft there are also mounted an eccentric 38 and a collar 39 provided with pins 40. The said eccentric and collar are adjustably mounted so that either may be brought into cooperation with the arm 21, so that the speed of actuation thereof may be chosen to fit different conditions. Actuation of the arm 21 by the eccentric 38 is, of course, limited by the speed of the shaft S—2, whereas actuation of the arm 21 by the collar 39 can be varied by equipping the collar with a greater or lesser number of pins, each of which kicks or actuates the arm 21 when brought into contact therewith.

The top of the work holder is provided with a platform 45 having recesses therein in which is secured a die 46 containing a diamond 47. Prior to the beginning of the operation the diamond may be provided with a slight depression which establishes the point at which the drilling operation begins. The diamond specifically shown in the drawings will illustrate and embody a work piece, it being understood that the apparatus is useful in connection with work pieces other than diamonds.

The drill spindle 1 is rotatably mounted in the self-adjusting bearings 50 and 51 secured, respectively, in horizontal strips 8c and 8b, and the drill spindle 1 is also mounted so as to vertically slide in those bearings. To the spindle 1 there is secured the pulley 52 which is driven by a driving pulley 53, one for each unit, mounted on shaft S—1, the connection between pulleys 53 and 52 being a belt 54 which rides over a pair of pulleys indicated collectively as 55a and under a pulley 55b for purposes which will be later explained.

The mechanism for separating the drill from the work piece so as to place the point of the drill at a position sufficiently removed from the work piece to permit the grinding operation and the movement of the grinding mechanism in consonance with the movement of the drill spindle and drill will now be described.

In laterally spaced relation to the drill spindle there is a plate 58 supported upon a rod 59, the end of the rod 59 being of reduced diameter at the top thereof and inserted in a recess in the plate and secured therein by means of a pin 60. The lower end of the rod 59 has a threaded portion 61 of reduced diameter the threads of which engage the interiorly threaded bushing 62 provided with ratchet 63 cooperating with pawl 64. By the operation of the pawl and ratchet the rod 59 and plate 58 may be lowered to offset for the shortening of the drill produced by the grinding thereof. The explanation of the ratchet and pawl mechanism and associated parts will be postponed until after completing the description of the mechanism for raising and lowering the drill spindle and drill in consonance with the grinding operation.

On the plate 58 there is pivoted by means of pivot 68 a lever element having arms 69 and 70. The arm 70 is pivotally joined by the pivot 71 to the rod 72 associated with the grinding mechanism. The arm 69 has adjacent the end thereof a pin 73 which cooperates with a block 75 secured to the rod 76 by means of a screw 77. The rod 76 is slidably journalled and guided in holes in the supporting strips 8b and 8c and carries a horizontal plate 78 secured on the rod 76 by means of a screw 79 passing through a block 80 secured to plate 78. The plate 78 supports a collar 81 secured to the pulley 52 and the collar 81 is adapted to rotate upon the plate 78. The plate 58 is provided with stops 82 and 83 to limit the movement of the arm 69. When the arm 69 moves upwardly the plate 78 also slides upon guide rod 84, the rod 84 passing through a hole in the plate 78, the guide rod 84 being secured to the strip 8a by mans of screw 85 (note Fig. 6). The plate 58 is slidably mounted not only on the guide rod 84 but also on the guide rod 86, the latter being secured to horizontal strip 8b by means of screw 87.

The spindle 1 is thus raised to an upper position by the upward movement of the arm 69 acting on the block 75 secured to the rod 76, this upward position being limited by the stop 82. When this upper position is reached the drill is separated from the work piece a distance sufficient to permit the grinding operation to occur. When the arm 69 descends the rod 76, plate 78 and pulley 52 likewise descend by gravity and the drill is lowered to a position in drilling relation with the work piece. The mechanism for limiting the downward movement of the arm 76, the plate 78, the pullley 52 and spindle 1 and controlling the lowermost position of the drill in drilling relation to the work piece, will now be explained.

To the upper portion of the plate 58 there is secured a rod 90 which extends into a recess in the plate 58 and is secured thereto by means of pin 91. The rod 90 is most clearly shown in Figs. 6, 11 and 12. The rod 90 extends through holes in support strips 8b and 8c and in this way is slidably mounted in relation to those strips. To this rod 90 there is secured a bar 92 (see Figs. 1, 11 and 12) by means of screw 93. At the end of the bar 92 opposite the screw 93 there is provided a screw 94 which engages a threaded portion in the end of member 95 of a frame comprising members 95 and 96, which frame supports guide pulleys 97 and 98 for driving the pulley 52 on the spindle 1. This guide pulley frame indicated generally by 99 is supported by and suspended from the screw 94 and is provided with vertical guide rods 100, 101. To the members 95 and 96 of the frame 99 there are secured guide rods 100 and 101 by means of screws and these guide rods 100 and 101 pass through holes in support strips 8c and 8b, respectively, and are therefore slidably mounted in relation to those support strips. It follows, therefore, that the guide frame 99 may be adjustably secured in relation to the bar 92 by adjustment of the screw 94, and it also follows that since the bar 92 is secured to the rod 90 (note Figs. 6, 11 and 12) that the guide frame 99 will ascend and descend by movement of the plate 58 to which the rod 90 is secured. The purpose of this ascent and descent will be more fully explained later in connection with the explanation of the ratchet and pawl mechanism shown in Fig. 6 which provides for the descent of the plate 58 to compensate for the shortening of the length of the drill. It will suffice at this particular point to state that the member 95 of the frame 99 extends underneath the plate 78, as clearly shown in Fig. 11, and thereby acts as a stop to determine the lowermost position of the drill spindle and drill and therefore determines the position of the drill in its lowermost position in drilling contact with the work piece, and it may be well to state at this point that the lowermost position of the drill is determined by the stop mentioned rather than by the action of the pin 83 on the plate 58 which merely limits the lowermost position of the arm 69.

It will also be seen, therefore, that with any given adjustment of the screw 94 that the lower limited position of the drill spindle and drill is determined by the position of the bar 92 on the rod 90 since the member 95 (the end of which acts as a stop for the plate 78) is secured to the screw 94. Since the bar 92 may be adjusted at any desired position on the rod 90 by means of screw 93, the lowermost position of the spindle 1 may be adjusted at a predetermined point. Furthermore, for any given position of the bar 92 on the rod 90, a further adjustment of the member 95 (the end of which acts as a stop for the plate 78) may be effected by the adjusting screw 94. In other words, for any given position of the bar 92 on the rod 90, the lowermost position of the plate 78 and therefore the pulley 52 and drill spindle 1, is automatically determined. In addition to this automatic provision the lowermost position of the drill spindle 1 may be manually adjusted by means of the screw 94. By means of the controls mentioned the relationship of the point of the drill to the work piece in the lowermost position of the drill may be controlled and adapted to different conditions as, for example, different sizes of work pieces.

At this point it may be well to mention that the frame 99 including the member 95 thereof, being secured to and suspended from the rod 90, will be lowered as the rod 90 and plate 58 are lowered and, therefore, that the lowermost position of the drill spindle will also be lowered in order to decrease the distance between the work piece and the lowermost position of the drill spindle as the drilling progresses in order to compensate for the shortening of the length of the drill by the grinding operation and thereby maintain proper cutting relation between the point of the drill and the work piece. The mechanism for lowering the plate 58 and therefore the rod 90 by means of the rod 59 (see Fig. 6) will be more fully described later.

Having described a specific illustration of mechanism which illustrates the principle of separating the drill point and the work piece and positioning the drill point in such spaced relation to the work piece as to accommodate the action of the grinding mechanism, there will now be described the mechanism for effecting movement of the grinding mechanism in synchronism and consonance with the movement of the drill spindle and drill, to effect control of grinding and shaping of the drill point.

Extending parallel to the front support strip 8a and in spaced relation thereto and supported in the end walls of the apparatus is a support strip 110. A pair of parallel bars 111, one pair for each unit (note Fig. 15) are secured in recesses 112 of this strip (see Fig. 4), the other ends of the bars being secured in the front support strip 8a in recess 114 therein. On these bars there is supported a transversely movable carriage 115 (note Fig. 14) on which is mounted a motor 116 provided with shaft 117 on which is mounted grinding wheel 118. At the end of the carriage 115 near the grinding wheel a housing 119 partly enclosing the grinding wheel is provided, this housing being an extension of part of the carriage 115. The carriage supports a transverse bracket 122 which in turn supports one end of a rod 123 carrying a coil spring 124 confined between collars 125, 126 secured to said rod, collar 125 bearing against the bracket 122, the rod 123 being received in a slot 127 in the bracket 122 and thereby being free to swing vertically in relation to said bracket. The collar 125 is, as shown, a part of a sleeve 128 which is adjustably positioned on the rod 123 by means of the nut 121 to regulate the backmost position of the collar 125.

A yoke 132 sliding upon the bars 111 carries a strap 134 secured to a sleeve 135 in which the rod 136 is adapted to slide and to which said rod 136 may be fixed by means of pin 138. When so fixed the sleeve 135 moves with the rod 136 and thereby effects translatory movement of the carriage 115 since the strap 134 and yoke 132 are secured to the motor carriage 115. The rod 136 is secured to ring 139 in threaded socket 140 therein, the said ring 139 being actuated by the eccentric 142. The eccentric mechanism will be described later.

The mounting of the motor on its motor carriage is most clearly shown in Figs. 14 and 15. On the carriage 115 there is mounted a horizontally swingable strip 190 pivotally mounted on the carriage 115 by means of the pivot pin 191. At the other end of the strip 190 there is an arcuate upstanding skirt portion 192 cooperating with a clamp 193 adjustably secured to the carriage 115 by means of an adjustable bolt 196. Adjacent the skirt portion 192 is a stop 197 which cooperates with a threaded adjusting pin 198 having a head 199, said pin being carried by the up-standing wall 200 of the carriage 115. The motor 116 is fastened to the pivotally mounted strip 190. By means of the clamp 193 and adjusting pin 198, the horizontal axis about which the grinding wheen rotates may be moved laterally. The purpose of this is to provide a means for controlling the contour of the drilling point. Reference to Fig. 5, for example, will show that the angular contour of the drilling point may be varied by laterally adjusting the horizontal axis of rotation of the grinding wheel in relation to the fixed vertical axis of the drill.

Extending parallel to the front supporting strips 8a, 8b and 8c supported by the transverse end walls there is a supporting and insulating strip 144 to the under side of which is secured, one for each drilling unit, a micro switch 145. To the upper surface of the strip 144 there is secured, on for each unit, securing means 146 to secure a pair of electrical lead wires 152. These are connected directly to the motor. At the securing means 146 the leads are connected to a pair of current supply wires not specifically shown which run lengthwise of the apparatus and one of which is interrupted by the micro switch so as to supply current to each of the motors, one of which is supplied for each grinding unit. Between the strip 110 and the micro switch 145 a horizontal sleeve 148 is mounted which freely slides between the strip 110 and the switch 145 on a rod 150 having a threaded end 150a which is threaded into and secured to the motor carriage and is therefore adapted to be moved back and forth with that carriage. The sleeve 148 rides freely on the rod 150. The sleeve 148 is also provided with an up-standing bracket 149 and the sleeve 148 and bracket 149 are biased against the head 150b of the rod 150 by means of a spring 155.

As the grinding wheel carried by the motor carriage approaches the position where the grinding wheel is brought into grinding relation with the drill point, the rod 150, moving with the carriage, causes the bracket 149 to bear against the button 153 on the micro switch by the action of the spring 155, whereby the motor is actuated and the grinding wheel rotated during the grinding operation. At the completion of this operation the return movement of the carriage moves the rod 150 in the opposite direction whereupon the bracket 149 is moved out of engagement with the button on the micro switch, the motor circuit is opened and rotation of the grinding wheel stops. By this means rotation of the grinding wheel is confined to the grinding operation.

When the pin 138 is fixed in the position shown (see Figs. 7 and 4) and the rod 136 moves in a direction from left to right as viewed in Fig. 7, the motor carriage, motor and grinding wheel mounted thereon are given a translatory movement to bring the grinding wheel into grinding relation with the point of the drill. At the same time the rod 123 moves with the motor carriage, actuates the lever having the arms 69 and 70 (note Fig. 6) which in turn raises the drill spindle I so that the translatory movement of the grinding wheel is synchronized with the raising of the drill spindle. In the specific mechanism shown, these two movements are effected by mechanisms which are inter-connected and inter-dependent, that is to say, the drill spindle raising is actuated by the lever arms 69 and 70 which in turn are actuated by the rod 123 carried by the motor carriage 115, so that the movement of this carriage not only raises the drill spindle to a position where it may be engaged by the grinding wheel but also moves the grinding wheel into engagement with the point of the drill. The translatory movement of the motor carriage and rod 123 is limited and arrested by the stop 82 on the plate 58. The carriage continues to move to a point determined by the furthest thrust of the rod 136 but when the grinding wheel comes into grinding relation with the point of the drill, the translatory movement of the rod 123 is arrested and the remaining portion of the translatory movement of the carriage is effected against the bias of the coil spring 124.

As the rod 136 is moved to the left in a direction of the view shown in Fig. 7 by the action of the eccentric 142, the motor carriage and grinding wheel are likewise moved to the left and out of the vertical path of movement of the drill spindle and drill, and at the same time the latter descend because of the downward motion of the lever arms 69, 70.

To effect translatory movement of the motor carriage and grinding wheel, eccentric and clutch mechanism are provided. This mechanism includes, for each drilling unit, a collar 158 fixed to the shaft S—3 by the set-screw 159. Eccentric 142 is mounted on the shaft S—3 and normally rotates loosely thereon. This eccentric carries a cam locking element 160 normally held out of engagement with the fixed collar 158 by an arm 161 attached to the cam locking element, which arm 161 is normally engaged by the dog 162 mounted on shaft 163 and biased by spring 164. When the dog 162 is tripped by a pin 166 on the collar 167 mounted on the shaft S—4, the spring 168 rotates the cam locking element into a position where it engages the corresponding socket 169 in the fixed collar 158, whereupon the eccentric then rotates with the fixed collar and actuates the ring 139 and the rod 136. The frequency with which the eccentric 142 and rod 136 are actuated depends upon the speed of rotation of the shaft S—4 and the number of actuating pins 166 secured to the periphery thereof, and this frequency can therefore be controlled to any desired degree. Therefor the frequency of the drilling and grinding operations can likewise be controlled.

After tripping of the dog or lever 162 mounted on the shaft 163 which actuates the clutch engagement between the fixed collar 158 and the eccentric 142, the latter makes a complete revolution and then comes to rest and rotates freely on the shaft S—3 because of disengagement of the cam locking element or clutch 160 with the fixed collar 158 by engagement of the arm 161 on the clutch or cam locking element 160 with the dog or lever 162, which lever after being tripped by a pin 166 on the collar 167 is re-set by the bias of spring 164. In other words, the clutch action which rotates the eccentric is actuated as soon as the lever or dog 162 is tripped by a pin 166 on the shaft S—4 and the clutch action is terminated as soon as the arm 161 is again engaged by the lever 162, after which termination the eccentric continues to rotate loosely on the shaft S—3 and the rod 136 therefore remains stationary until the lever 162 is again tripped by the next succeeding pin 166 on the shaft S—4. A complete revolution of the eccentric by actuating the rod 136 and consequently the motor carriage 115, the rod 123 and the arm 69, 70 causes the raising of the drill and drill spindle, the movement of the grinding wheel into grinding relation with the drill, the maintenance of the grinding wheel in contact with the drill, the movement of the grinding wheel out of the vertical path of movement of the drill and the lowering of the drill into drilling relation with the work piece. In other words, the complete revolution of the eccentric 142 covers a complete cycle of operations with the exception of the drilling period.

The drilling operation occurs after the eccentric has retracted the grinding mechanism out of the path of the drill and drill spindle and when the eccentric rides loosely on the shaft S—3. The drilling operation therefore begins as soon as the eccentric 142 has made a complete revolution, comes to rest and rides loosely on the shaft S—3, and that operation continues until the clutch or cam locking element 160, 161 is again drawn into clutching relation by a pin 166 on the collar 167, which pin next succeeds in the rotation of shaft S—4 the pin which initiated the preceding clutch action and rotation of the eccentric. In other words, the entire time of a cycle beginning with the raising of the drill and ending with the termination of the drilling operation, is the time between successive engagements of two adjacent pins 166 on the collar 167 with the lever or dog 162. If, as specifically shown in Fig. 4, there are four pins 166 equally distributed about the collar 167 so that the axis of the pins intersect at right angles, as diagrammatically illustrated in Fig. 13, then the time of a complete cycle is one-quarter of the time required for a complete rotation of the shaft S—4. The distribution in this cycle of the time allocated to drilling and the time allocated to raising the drill, grinding the point thereof and lowering it may be selected at will by adjusting the relative times of rotation of the shafts S—3 and S—4. It will be understood that the time of rotation of shaft S—3 will always be less than the time required for any two successive pins 166 on the shaft S—4 to engage the lever 162.

It will therefore be seen that the frequency of the entire cycle will be governed by the speed of the shaft S—4 and the number of pins 166 thereon, while the distribution in this complete cycle of the times of drilling as compared with the times of raising the drill, grinding it and lowering it will be governed by the speed of shaft S—3. It will therefore be apparent that if there are four pins 166 on the collar 167 a complete revolution of the shaft S—4 will produce four operation cycles. These are indicated diagrammatically in Fig. 13 by the four quadrants produced by the intersecting dotted lines perpendicular to each other. In this figure the arc identified as D subtends an angle which corresponds to the drilling period and the arc identified as G subtends an angle corresponding to the grinding period, the sum of these two arcs constituting an angle of 90 degrees corresponding to the complete cycle of drilling and grinding.

Going back now to the mechanism for lowering the drill spindle in its relation to the work piece to compensate for the shortening of the drill caused by the grinding thereof, as previously mentioned, the rod 59 supports the plate 58 which plate supports the rod 90, which in turn controls the position of the drill spindle in relation to the work piece. The lower threaded end 60 of the rod 61 engages an interiorly threaded bushing 62 to which is secured a ratchet wheel 63 provided with pawls 64 carried by a rotatably mounted plate 65 having a depending arm 66 biased by a spring 67 secured to bracket 172 by screw 173. An adjustable stop 177 is carried by a collar 178 adjustably mounted on the sleeve 180. The stop 177 may be fixed in any desired position in relation to the depending arm 66 by means of set-screw 181. The spring 67 normally maintains the depending arm 66 against the stop 177. The angular rotation of the plate 65, and therefore the ratchet wheel 63 and rod 59, depends upon the adjusted position of the collar 178 and stop 177. Therefore the extent of downward movement of the rod 59 caused by rotation of the ratchet wheel 63 is likewise controlled by this adjustment. Actuation of the depending arm 66 and plate 65 and therefore ratchet wheel 63, is effected by pins or screws 182 mounted on collar 183, which in turn is mounted on the shaft S—5 which in turn is connected by the sprocket 184, as shown in Fig. 2. The frequency with which the rod 59 is caused to move downwardly, preferably but not necessarily while the drill is out of engagement with the grinding wheel, depends upon the speed of the shaft S—5 and the number of pins 182 mounted thereon and therefore can be adjusted in any desired manner. When the rod 59 has reached its lowermost position a suitable tool is inserted through the hole 185 (note Fig. 6) which tool engages a slot 186 in the threaded bushing or sleeve 62. Rotation of the tool then causes rotation of the threaded bushing or sleeve 62 in a direction contrary to that caused by the operation of the ratchet wheel, and the rod may be raised to a predetermined higher position.

As previously explained, means are provided for controlling the degree of pressure of the drill point on the work piece. Reference to Figs. 4, 11 and 12 will show certain specific illustrations of mechanism which may be employed to embody the principle of pressure control between the point of the drill and the work piece. The belt 54 which actuates pulley 52 rides over guide pulleys indicated collectively as 55a and individually as 97, 98 (note Figs. 11 and 4) and is then downwardly directed by means of tension pulley 55b rotatably mounted on the end of arm 201. This arm 201 is pivotally mounted on the pivot 202 and biased by the spring 203 attached to the arm 201 at one end of that arm by the pin 204, said spring at the other end thereof being secured to the bracket 205 by means of screw 204a. The bracket 205 is slidably and adjustably mounted on the rod 206 which is secured to the pivot 202. Therefore, by moving the bracket 205 up and down on the rod 206 the tension on the spring 203 may be varied and therefore the tension of the tension pulley 55b on the belt 54 may likewise be varied. The guide pulleys 97, 98 are rotatably supported on pivots carried by posts 207 which are vertically and slidably adjustable in holes in the members 95, 96 of the guide pulley frame indicated generally as 99, and may be secured therein at any desired position by means of screws 208 (note Figs. 4, 11 and 12).

As previously explained, the lowermost position of the drill point is determined not by the stop 83 on the plate 58 but by the stop or supporting plate 78 carried on the lifting rod 76. Against this plate 78, collar 81 secured to drive pulley 52 bears. The position of the plate 78 on the rod 76 may be adjusted by the adjusting screw 79 so that in its lowermost position the drill would bear upon the work piece with the full weight of the drill spindle, driving pulley 52 and collar 81 unless otherwise controlled. Such control may be provided by the adjustably positioned guide pulleys 97, 98 and 55b, and it will be seen that by adjusting these pulleys relative to each other and to the drive pulley 52 that the tension on the belt 54 and the angular relation of the axis of said belt 54 to the vertical axis of the spindle may impart an upward component of force to the spindle in opposition to the downward gravitational force whereby pressure of the drill point on the work piece may be controlled.

As previously indicated, one of the uses of the present invention is in the manufacture of wire-drawing dies which comprise a hard substance, usually a diamond, mounted in a die mounting. It is desired to create in the diamond an opening, the contour of which is generally conical, that is, the opening has a maximum diameter which progressively diminishes to a minimum diameter or axis. The point of minimum diameter or axis corresponding to the apex of the generally conical section may be at a predetermined point on a diameter passing through the diamond and intermediate between the ends of that diameter or axis. From that point on a hole of predetermined dimensions can be carried through, that hole beginning at the apex of the conical section previously mentioned and extending through to the other side of the diamond and constituting the hole which determines the diameter of the wire to be drawn through the die. In other words, in the wire-drawing operation the generally conical section gradually causes the diameter of the drawn wire to be decreased and the diameter of that wire is then controlled and established by passing through the hole which extends from the apex of the conical section through to the other side of the diamond. It is possible to create this latter hole by hand but it is preferably created by automatic drilling mechanism, for which purpose the machine described in copending application Serial No. 461,723, filed on even date herewith, is particularly adapted especially for the creation of holes of extremely small diameters which may, for example, be of the order of 0.0002 inch. This particular dimension is in no way given as a restriction or limitation but merely as an illustration of the fineness of the hole which can be effected by means of the machine of said copending application.

The two inventions, therefore, that of this application and that of copending application Serial No. 461,723, are capable of being employed in conjunction with each other to manufacture wire-drawing dies to good advantage. The present invention is, of course, not restricted to the particular cooperation mentioned, which is pointed out merely to illustrate one of the advantages of the present invention.

What is claimed is:

1. In drilling apparatus for drilling a work piece, said apparatus including a drill mounted to rotate about its vertical axis and a work holder adapted to carry a work piece positioned below said drill and in continuously maintained vertically co-axial alignment therewith, the improvement which comprises means to raise the drill at regularly recurring and predetermined intervals in a vertical path above and in spaced relation to the work piece and in non-drilling relation thereto and to lower the drill through the same path into drilling relation with the work piece; a grinding wheel mounted on a shaft having an axis transverse to the axis of the drill; means to rotate said shaft and wheel; means operatively connected to said drill raising and lowering means to effect a translatory movement of said grinding wheel in relation to said work support and through a path transverse to the vertical axis of the drill at regularly recurring intervals in synchronism with the said raising and lowering movement of the drill to bring the grinding surface of the wheel into grinding engagement with the point of said drill while said drill is out of contact with said work piece, and to move said grinding wheel out of grinding engagement with said drill point after the completion of the grinding operation.

2. In drilling apparatus for drilling a work piece, said apparatus including a drill mounted to rotate about its vertical axis and a work holder adapted to carry a work piece positioned below said drill and in continuously maintained vertically co-axial alignment therewith, the improvement which comprises means to raise the drill at regularly recurring and predetermined intervals in a vertical path above and in spaced relation to the work piece and in non-drilling relation thereto and to lower the drill through the same path into drilling relation with the work piece; a grinding wheel mounted on a shaft having an axis transverse to the axis of the drill; means to rotate said shaft and wheel; means operatively connected to said drill raising and lowering means to effect a translatory movement of said grinding wheel in relation to said work support and, through a path transverse to the vertical axis of the drill, toward and away from grinding engagement with the drill point while the drill is in spaced and non-drilling relation to the work piece; means to arrest the transverse movement of the grinding wheel when it is brought into said grinding engagement and to maintain the wheel in said arrested position during a predetermined grinding interval; and means to synchronize the transverse movement of the grinding wheel with the vertical movement of the drill to effect grinding engagement of the wheel and drill when the latter is in said above mentioned spaced relation to the work piece and in non-drilling relation thereto.

3. In drilling apparatus for drilling a work piece, said apparatus including a drill mounted to rotate about its vertical axis and a work holder adapted to carry a work piece positioned below said drill and in continuously maintained vertically co-axial alignment therewith, the improvement which comprises means to raise the drill at regularly recurring and predetermined intervals in a vertical path above and in spaced relation to the work piece and in non-drilling relation thereto and to lower the drill through the same path into drilling relation with the work piece; a grinding wheel mounted on a shaft having an axis transverse to the axis of the drill; means to rotate said shaft and wheel; means operatively connected to said drill raising and lowering means to effect a translatory movement of said grinding wheel in relation to said work support and through a path transverse to the vertical axis of the drill, toward and away from grinding engagement with the drill point while the drill is in spaced and non-drilling relation to the work piece; means to arrest the transverse movement of the grinding wheel when it is brought into said grinding engagement and to maintain the wheel in said arrested position during a predetermined grinding interval; means to synchronize the transverse movement of the grinding wheel with the vertical movement of the drill to effect grinding engagement of the wheel and drill when the latter is in said above mentioned spaced relation to the work piece and in non-drilling relation thereto; and means operatively connected to said grinding wheel moving means to effect rotatory movement of the grinding wheel shaft when in drill grinding position and to arrest rotary movement when out of said position.

4. In drilling apparatus in combination a drill spindle carrying a drill at the lower end thereof, a work holder positioned below and in spaced and vertically co-axial relation to the drill and adapted to carry at the top of said work holder a work piece which during drilling operation is in drilling relation with the point of said drill; means to effect at regularly recurring and predetermined intervals a relative vertical movement between said work holder and said drill spindle which movement separates the drill point and work piece, positions the drill point in vertically spaced non-drilling relation to said work piece and then returns the drill so that the point thereof is restored to drilling relation with the work piece; a rotatably mounted grinding wheel having an axis of rotation transverse to the axis of the drill spindle and work holder; means to rotate said grinding wheel; means operatively connected to said means for effecting said relative vertical movement to effect a translatory movement of said grinding wheel in relation to said work support, through a path transverse to the vertical axis of the drill, toward and away from grinding engagement between the grinding surface of the wheel and the drill point while the drill is in vertically spaced and non-drilling relation to the work piece; and means to synchronize the transverse movement of the grinding wheel with the vertical movement of the drill to effect grinding engagement of the wheel and drill when the latter is in said above mentioned spaced relation to the work piece and in non-drilling relation thereto.

5. In drilling apparatus in combination a drill spindle carrying a drill at the lower end thereof, a work holder positioned below and in spaced and vertically co-axial relation to the drill and adapted to carry at the top of said work holder a work piece which during drilling operation is in drilling relation with the point of said drill; means to effect at regularly recurring and predetermined intervals a relative vertical movement between said work holder and said drill spindle which movement separates the drill point and work piece, positions the drill point in vertically spaced non-drilling relation to said work piece and then returns the drill so that the point thereof is restored to drilling relation with the work piece; a rotatably mounted grinding wheel having an axis of rotation transverse to the axis of the drill spindle and work holder; means to rotate said grinding wheel; means operatively connected to said means for effecting said relative vertical movement to effect a translatory movement of said grinding wheel in relation to said work support, through a path transverse to the vertical axis of the drill, toward and away from grinding engagement between the grinding surface of the wheel and the drill point while the drill is in spaced and non-drilling relation to the work piece; means to arrest the transverse movement of the grinding wheel when it is brought into grinding engagement with the drill point and to maintain the wheel in said arrested position during a predetermined grinding interval; and means operatively connected to said grinding wheel moving means and said relative movement effecting means to synchronize the transverse movement of the grinding wheel with the vertical movement of the drill to effect grinding engagement of the wheel and drill when the latter is in said above mentioned spaced relation to the work piece and in non-drilling relation thereto.

6. In drilling apparatus in combination a support for a drill spindle carrying a drill at the lower end thereof, a work holder being positioned below and in spaced vertically co-axial relation to the drill and adapted to carry at the top of said work holder a work piece which during drilling operation is in drilling relation with the point of said drill; means to effect at regularly recurring and predetermined intervals a relative vertical movement between said work holder and said drill spindle which movement separates the drill point and work piece, positions the drill point and drill spindle in predetermined vertically spaced non-drilling relation to said work piece and then returns the drill spindle toward the work piece so that the point of the drill is restored to cutting relation with the work piece; a rotatably mounted grinding wheel having an axis of rotation transverse to the axis of the drill spindle and work holder; means to rotate said grinding wheel; means operatively connected to said means for effecting said relative vertical movement to effect a translatory movement of said grinding wheel in relation to said work holder, through a path transverse to the vertical axis of the drill, toward and away from grinding engagement between the grinding surface of the wheel and the drill point while the drill is in spaced and non-drilling relation to the work piece; means operatively connected to said grinding wheel moving means and said relative vertical movement effecting means to synchronize the transverse movement of the grinding wheel with the vertical movement of the drill to effect grinding engagement of the wheel and drill when the latter is in said above mentioned spaced relation to the work piece and in non-drilling relation thereto; and means operatively connected to said grinding wheel moving means and arranged and adapted to intermittently and progressively effect repositioning vertical adjustment between said drill spindle support and said work holder to decrease the minimum distance separating the drill spindle and work holder, to compensate for wearing away of the drill caused by grinding and to maintain cutting relation between the point of the drill and the work piece.

7. In drilling apparatus in combination a drill spindle carrying a drill at the lower end thereof, a work holder positioned below and in spaced vertically co-axial relation to the drill and adapted to carry at the top of said work holder a work piece which during drilling operation is in drilling relation with the point of said drill; means to effect at regularly recurring and predetermined intervals a relative vertical movement between said work holder and said drill spindle which movement separates the drill point and work piece, positions the drill point in vertically spaced non-drilling relation to said work piece and then returns the drill so that the point thereof is restored to drilling relation with the work piece; a rotatably mounted grinding wheel having an axis of rotation transverse to the axis of the drill spindle and work holder; means operatively connected to said means for effecting said relative vertical movement to rotate said grinding wheel in relation to said work support; means to effect a translatory movement of said grinding wheel, through a path transverse to the vertical axis of the drill, toward and away from grinding engagement between the grinding surface of the wheel and the drill point while the drill is in spaced and non-drilling relation to the work piece; and means operatively connected to said grinding wheel moving means and said relative vertical movement effecting means to synchronize the transverse movement of the grinding wheel with the vertical movement of the drill to effect grinding engagement of the wheel and drill when the latter is in said above mentioned vertically spaced non-drilling relation to the work piece; means to rotate the work holder and drill; and means to effect, while the drill is in drilling relation with the work piece, a series of rapidly recurring up and down movements of the drill and work piece relative to each other.

8. In drilling apparatus in combination a drill spindle having a vertical axis and carrying a drill at the lower end thereof, a work holder having a vertical longitudinal axis, said work holder being positioned below and in spaced relation to the drill and adapted to carry at the top of said work holder a work piece which during drilling operation is in drilling relation with the point of said drill; means to effect at regularly recurring and predetermined intervals a relative vertical movement of work holder and drill spindle which movement separates the drill point and work piece, positions the drill point in spaced relation to said work piece and in non-drilling relation thereto and then returns the drill so that the point thereof is restored to drilling relation with the work piece; a rotatably mounted grinding wheel having an axis of rotation transverse to the axis of the drill spindle and work holder; means to rotate said grinding wheel; means to effect a translatory movement of said grinding wheel, through a path transverse to the vertical axis of the drill, toward and into grinding engagement between the grinding surface of the wheel and the drill at the point thereof, and away from and out of the vertical path of movement of said drill while the drill is in spaced and non-drilling relation to the work piece; and means to synchronize the transverse movement of the grinding wheel with the vertical movement of the drill to effect grinding engagement of the wheel and drill when the latter is in said above mentioned spaced relation to the work piece and in non-drilling relation thereto; said means to rotate the grinding wheel and the means to effect a translatory movement thereof comprising a motor having a shaft on which said grinding wheel is mounted, the axis of said shaft being perpendicular to the axis of the spindle and drill, a carriage on which said motor is mounted, said motor being pivotally mounted on said carriage to swing through an arc in a horizontal plane, and means to adjustably secure said motor to said carriage at a predetermined point on said arc to control the position of the circumference of said grinding wheel to the axis of the drill and thereby control the contour of the drill point obtained by the grinding action of said wheel on said drill point.

9. In a drilling machine wherein a rotatable drill spindle, a drill carried thereby, and a rotatable work piece support are mounted in continuously maintained vertically co-axial alignment, and the drill spindle is movable endwise in a direction away from said work piece support to drill grinding position and in the opposite direction toward said work piece support to work piece drilling position and a grinding wheel is provided for sharpening a drill carried by the spindle when the latter is in drill grinding position, the combination of a grinding wheel carrier which is movable horizontally in relation to said work piece support, means operatively connected to said carrier and arranged and adapted to move said carrier and thereby said grinding wheel toward and from drill grinding position, means operatively connected to said spindle and arranged and adapted to move said spindle and thereby said drill endwise vertically toward and from drill grinding position, and means operatively connected to said carrier moving means and to said spindle moving means and arranged and adapted to actuate said spindle moving means and said carrier moving means periodically and in synchronized relation whereby said spindle is moved vertically toward and from drill grinding position and said carrier is moved horizontally and simultaneously with said spindle toward and from drill grinding position.

10. In a drilling machine wherein a rotatable drill spindle, a drill carried thereby, and a rotatable work piece support are mounted in continuously maintained vertically co-axial alignment and in operative relation to a drill grinding wheel, and the drill spindle is movable endwise toward said work piece support for drilling and away therefrom for grinding, the combination of a spindle supporting frame, means for moving said frame vertically to effect said endwise movement of said drill spindle, and means mounted on said frame and operatively connected with said frame moving means and said spindle and arranged and adapted to progressively vary the operative position of said spindle vertically in relation to said frame and to an extent corresponding to shortening of the drill by grinding thereby to maintain a predetermined operative drilling relation between the drill carried by said spindle and said work piece support.

11. In a drilling machine wherein a rotatable drill spindle, a drill carried thereby, and a rotatable work piece support are mounted in continuously maintained vertically co-axial alignment and the drill spindle is movable endwise toward said work piece support for drilling and away therefrom for grinding, the combination of a spindle supporting frame, means for moving said frame vertically to effect said endwise movement of said drill spindle, means mounted on said frame and operatively connected with said frame moving means and said spindle to progressively vary the operative position of said spindle vertically in relation to said frame to compensate for shortening of the drill by grinding, means for rotating said spindle including a pulley on the spindle and a pulley engaging driving belt having its pulley engaging bight in a plane angularly disposed to the spindle, means operatively related to said belt and arranged and adapted to yieldingly maintain the bight thereof in operative driving relation to said pulley, and means operatively connected to said last mentioned means and to said belt and arranged and adapted to effect adjustment of the angular position of said pulley engaging bight in relation to the spindle axis.

12. In a drilling machine wherein a rotatable drill spindle, a drill carried thereby, and a rotatable work piece support are mounted in continuously maintained vertically co-axial alignment and the drill spindle is movable endwise toward and away from said work piece support, the combination of a spindle supporting frame, means for moving said frame vertically to effect said endwise movement of said drill spindle, means for rotating said spindle including a pulley thereon having a V shaped peripheral belt groove and a driving belt arranged with its bight engaging said groove in a plane angularly disposed to the spindle and the pulley axis, whereby said belt exerts a vertically acting component of force on said pulley and said spindle, and means operatively related to said belt and arranged and adapted to yieldingly maintain the bight thereof in operative driving relation to said pulley.

13. Apparatus adapted for drilling fine wire dies comprising in combination a vertically movable drill spindle mounted for rotation, a die holder mounted for rotation, means to lift the drill from the die at intervals, a pulley mounted on the drill spindle, a flexible drive for the pulley positioned to impose upward bias on the spindle to relieve pressure on the drill, and means to alter tension of the flexible drive to adjust the bias on the drill.

14. In apparatus for drilling fine wire dies containing a plurality of pairs of vertical drills and dies, in combination a common drive, means connected therewith to rotate each drill and each die, and associated with each drill: a support in which the drill may be lifted in its drilling axis, a frame carrying a lever arm to lift the drill in its support, and carrying a stop to limit the return of the drill toward the die during drilling, a pulley to rotate the drill and a flexible driving means for each pulley, the driving means being positioned to impart an upward bias to the drill, and means associated therewith to vary the pull of the driving means whereby the drill bias is varied, a grinder having a grinding face adapted to operate longitudinally toward the point of each drill, and a carriage to move the grinder in a constant direction into sharpening contact with the drill, means carried by the frame for the drill support to synchronize operation of the drill-lifting lever with movement of the grinder carriage, and means associated with the frame and associated with the common drive to lower the frame progressively as the drill is shortened by grinding.

15. Apparatus for drilling fine wire dies including in combination, a spindle adapted to hold a drill, a mounting for rotatively supporting said spindle in drilling position and also in drill-sharpening position, means for moving said spindle to and from drilling position and drill-sharpening position, drill-sharpening means having a grinding surface, means to support and to operate said grinding surface substantially longitudinally of a drill in the spindle, and means for moving said grinding surface into and out of drill-sharpening position.

16. Apparatus for drilling fine wire dies including in combination, a spindle adapted to hold a drill, a mounting for rotatively supporting said spindle in drilling position and also in drill-sharpening position, means for moving said spindle to and from drilling position and drill-sharpening position, a grinding wheel, means for rotatively supporting said grinding wheel on an axis substantially normal to the longitudinal axis of a drill in the spindle, and means for moving said grinding wheel along its axis into and out of drill-sharpening position.

17. Apparatus for drilling fine wire dies including in combination, a spindle adapted to hold a drill, a mounting for rotatively supporting said spindle in drilling position and also in drill-sharpening position, means for moving said spindle to and from drilling position and drill-sharpening position, a grinding wheel, means for rotatively supporting said grinding wheel on an axis substantially normal to the longitudinal axis of a drill in the spindle, comprising a carriage supporting the grinding wheel and adapted to move the grinding wheel along its axis into and out of drill-sharpening position, and means comprising an arm coupled with the grinder carriage to hold the spindle in drill-sharpening position when the grinding wheel is in drill-sharpening position.

18. Apparatus for drilling fine wire dies including in combination, a spindle adapted to hold a drill in a drilling axis, a mounting for rotatively supporting said spindle in drilling position and also in drill-sharpening position in the drilling axis, means for moving said spindle from drilling position to drill-sharpening position, means to return the spindle toward drilling position, a stop to limit the extent of return of the spindle to drilling position, and means to impose on the spindle a bias away from drilling position to minimize pressure of the drill on the die on return to drilling.

19. Apparatus for drilling fine wire dies including in combination, a spindle adapted to hold a drill in a drilling axis, a mounting for rotatively supporting said spindle in drilling position and also in drill-sharpening position in the drilling axis, means for moving said spindle to and from drilling position and drill-sharpening position, a grinding wheel, means for rotatively supporting said grinding wheel on an axis substantially normal to the drilling axis, means to move the grinding wheel into and away from the drilling axis, a stop to limit the extent of return of the spindle to drilling position, means to impose on the spindle a bias away from drilling position to minimize pressure of the drill on the die on return to drilling, and means to advance the spindle stop and the spindle-biasing means together toward drilling position to compensate for shortening of a drill.

20. Apparatus for drilling fine wire dies including in combination, a spindle adapted to hold a drill, a mounting for rotatively supporting said spindle in drilling position and also in drill-sharpening position, means for moving said spindle to and from drilling position and drill-sharpening position, a grinding wheel, means for rotatively supporting said grinding wheel on an axis substantially normal to the longitudinal axis of the drill, comprising a carriage supporting the grinding wheel and adapted to move the grinding wheel along its axis into and out of drill-sharpening position, means comprising an arm coupled with the grinder carriage to hold the spindle in drill-sharpening position when the grinding wheel is in drill-sharpening position, the spindle-holding arm being mounted on a base, and means to advance the base progressively toward drilling position to compensate for shortening of the drill.

21. Apparatus for drilling fine wire dies including in combination, a spindle adapted to hold a drill in a drilling axis, a mounting for rotatively supporting said spindle in drilling position and also in drill-sharpening position in the drilling axis, a die holder, a mounting for rotatively supporting the die holder in the drilling axis and normally out of contact with a drill in the spindle, means to kick the rotatable die holder intermittently toward the drill and into drilling contact therewith, means to move the drill spindle in the drilling axis to and from drilling position and drill-sharpening position, and means imposing a bias on the spindle away from the die holder to relieve drilling pressure.

22. Apparatus for drilling fine wire dies including in combination, a spindle adapted to hold a drill, a mounting for rotatively supporting said spindle in drilling position and also in drill-sharpening position, means for moving said spindle to and from drilling position and drill-sharpening position, a grinder, means supporting said grinder to rotate about an axis substantially normal to the longitudinal axis of the drill, and means for moving said grinder along its axis into and out of drill-sharpening position, and means to adjust the grinder in its angular grinding relationship to the drill while retaining its axis in its substantially normal position with respect to the drill.

23. Apparatus for drilling fine wire dies including in combination, a spindle adapted to hold a drill, a mounting for rotatively supporting said spindle in drilling position and also in drill-sharpening position, and means to relieve pressure of the drill on the die with the spindle in drilling position comprising means on the drill spindle to rotate with the spindle, said spindle means being adapted upon rotation of the spindle to bias the spindle away from drilling position.

24. A spindle, a drill mounted in said spindle, a mounting for a die, means for causing relative movement between the mounting and the spindle, means for controllably biasing the spindle away from the die, means for rotating the spindle, means for rotating the die, a grinding surface, means for causing a grinding surface to grind longitudinally of the drill when the drill is out of contact with the die.

LEO ROBBINS.